United States Patent [19]

Bavelloni

[11] Patent Number: 4,537,301

[45] Date of Patent: Aug. 27, 1985

[54] PRESSURE SHOE FOR GLASS PROCESSING APPARATUS

[75] Inventor: Franco Bavelloni, Appiano Gentile, Italy

[73] Assignee: Z. Bavelloni S.p.A., Bregnano, Italy

[21] Appl. No.: 488,460

[22] Filed: Apr. 25, 1983

[51] Int. Cl.³ .............................................. B65G 15/14
[52] U.S. Cl. ..................................... 198/626; 198/698
[58] Field of Search .............. 198/626, 627, 698, 604, 198/628

[56] References Cited

U.S. PATENT DOCUMENTS 4,079,551  3/1978  Bando ........................... 198/626 X

FOREIGN PATENT DOCUMENTS 1135825  8/1962  Fed. Rep. of Germany ...... 198/627
721573  11/1966  Italy ..................................... 198/626

Primary Examiner—Joseph E. Valenza
Assistant Examiner—Jonathan D. Holmes
Attorney, Agent, or Firm—Guido Modiano; Albert Josif

[57] ABSTRACT

The shoe is used as a glass plate pressing or backing-up member attached on a conveyor of a glass plate edge bevelling machine. The shoe comprises an elongate body. On one face thereof the elongate body is provided with blocks adapted for abutment engagement with large plate glass workpieces to be processed. A small supporting plate member movably connected to the elongate body is positionable at a first position, whereat the small plate member defines an extension of the elongate body, adapted for engagement with and for pressing or backing-up small size plate glass workpieces to be processed. The small plate member is further positionable at a second idle position, whereat it is accommodated within the elongate body in association with the blocks, without interfering with larger glass workpieces to be supported by the elongate body.

6 Claims, 7 Drawing Figures

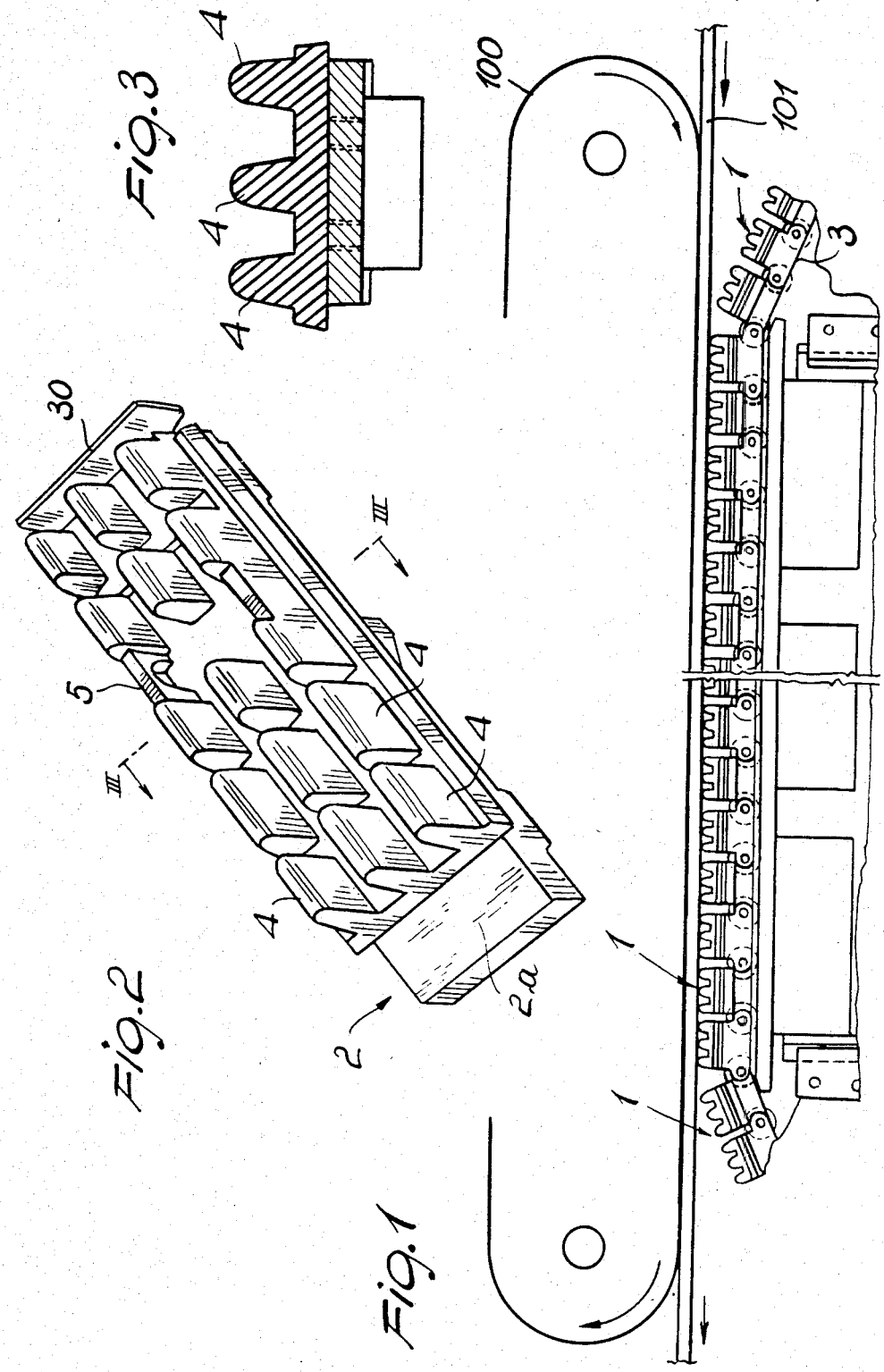

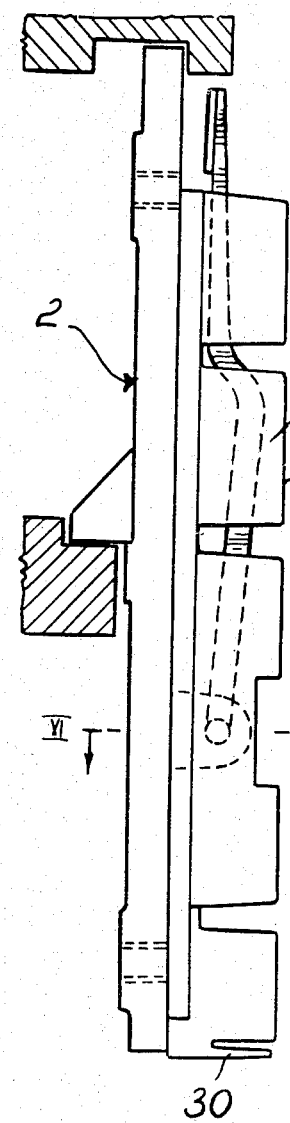
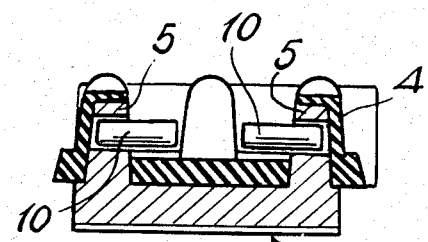
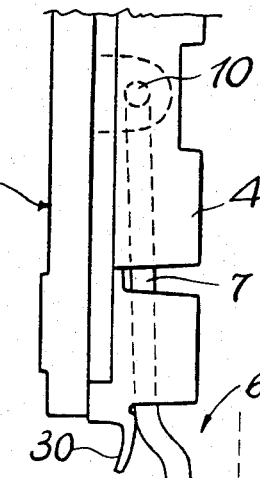
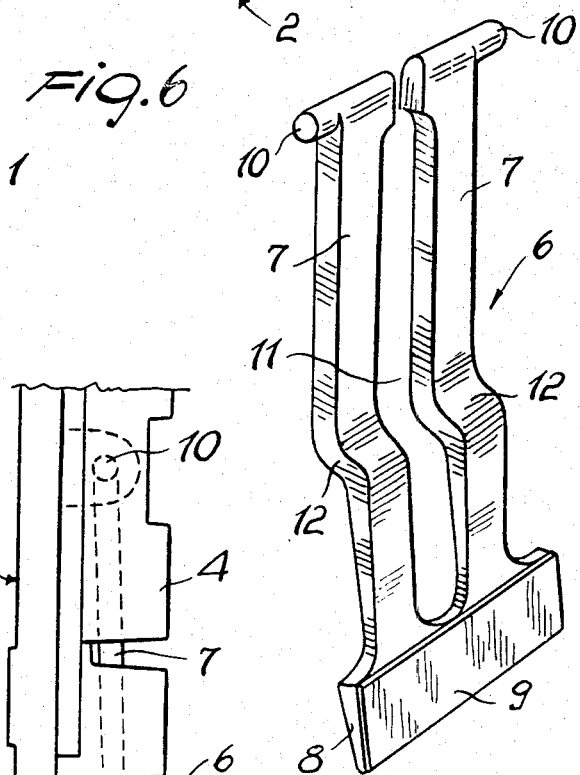
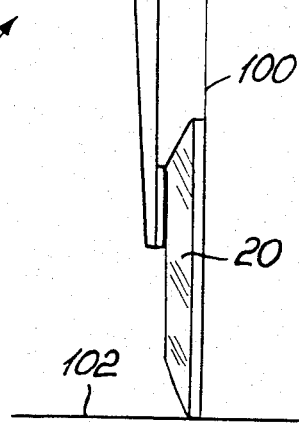

PRESSURE SHOE FOR GLASS PROCESSING APPARATUS

BACKGROUND OF THE INVENTION

This invention relates to a pressure shoe structure particularly for chamfering or glass plate edge bevelling machines and glass processing machines in general.

It is known that chamfering machines are equipped with a plate glass conveyor belt whereon the plate glass is transported edgewise and which comprises a plurality of shoes arranged in a closed loop configuration, the pressing or backing-up shoes being adapted to engage with the plate glass and clamp it against a counter-conveyor during the various processing steps.

In order to accommodate the glass edge processing equipment, it is necessary to leave a spacing between the shoe and the surface on which the plate glass edge rests, so that a standardized design shoe cannot engage with small size plate glass workpieces, such as ones measuring but few centimeters along their sides.

To obviate this limitation, shoes have been proposed which have, at their ends facing the edge of a plate glass workpiece being processed, an extension blade enabling contact engagement even with plate glass workpieces measuring 40×40 mm.

That approach has shown not to be always practicable, because the presence of the blades currently in use does not permit an accurate positioning of plate glass workpieces of small size, and involves time-consuming operations for removal, where use of the blade is not required.

SUMMARY OF THE INVENTION

It is a primary object of this invention to remove such prior drawbacks by providing a pressure shoe particularly useful with chamfering machines and glass processing machines in general, which allows engagement even with small size plate glass workpieces, such as one measuring 40×40 mm, while affording the possibility of quickly disassembling the element of engagement with small size plate glass workpieces without interfering with the processing of larger size workpieces.

It is another object of this invention to provide a pressure shoe structure which, owing to its peculiar construction features, can give full assurance of being reliable and safe to use.

A further object of this invention is to provide a pressure shoe of an extremely simplified construction, and being highly versatile in application, thereby it can readily and easily be adapted to meet different contingent requirements of the user.

According to one aspect of the invention, these and other objects, such as will be apparent hereinafter, are achieved by a pressure shoe structure particularly for chamfering machines, comprising an elongate body associable with the conveyor of a glass processing machine and being provided, on one face thereof, with blocks for engagement in contact relationship with plate glass workpieces being processed, characterized in that it comprises a small plate adapted to be connected to said elongate body and positioned at a first position whereat it forms an extension of said body to engage with small size plate glass workpieces, and at a second position whereat it is accommodated within said body without interfering with the plate glass workpieces being processed.

BRIEF DESCRIPTION OF THE DRAWINGS

Further features and advantages of this invention will be more clearly understood from the following detailed description of a pressure shoe structure particularly for chamfering machines, as illustrated by way of example only in the accompanying drawings, where:

FIG. 1 shows in plan view schematically a machine incorporating a plurality of pressure shoes according to this invention;

FIG. 2 shows schematically a perspective view of the elongate body;

FIG. 3 is a sectional view taken along the line III—III of FIG. 2;

FIG. 4 shows the shoe with the plate located at its first position;

FIG. 5 shows the shoe with the plate located at its second position;

FIG. 6 is a sectional view taken along the line VI—VI of FIG. 5; and

FIG. 7 is a schematical perspective view of the plate.

DESCRIPTION OF THE PREFERRED EMBODIMENTS

Making reference to the drawing figures, the pressing or backing-up shoe structure according to the invention, which is generally designated with the reference numeral 1, comprises an elongate body 2 which may be associated, in a manner known per se, with a conveyor belt 3 of a plate glass processing machine, such as a chamfering machine.

The cited body 2 has a flattened and elongated configuration, and has on one face 2a thereof, a plurality of blocks 4, advantageously formed from a rubber or other similar material, which are arranged in longitudinal rows and define a free engagement surface 4a (FIG. 5).

At a middle portion of the face 2a, there are provided small auxiliary supporting ears 5 with which a small plate 6 may be engaged.

More specifically, the plate 6 has a substantially yoke-like configuration and defines a pair of legs 7 united at one end into a pressure blade 8 which is coated by a soft layer 9, and having at the other end a pair of cross-pins 10 for journalled connection to said ears 5.

The plate 6 of yoke-like configuration defines a throughgoing slot 11 between its legs 7, the function whereof will be explained hereinafter.

Moreover, the legs 7 have, at a longitudinally extending middle portion thereof, a bend 12 which has the function of imparting a degree of elasticity to the plate itself.

As mentioned, the plate 6 is journalled to the body 2 such that it may be positioned at a first position (FIG. 4), where the legs 7 protrude out of the body 2 and are located to form a supporting extension of the body, thereby the blade 8 with its coating 9 can engage in contact with a small size plate glass workpiece, indicated at 20.

The plate 6 may be positioned, where required, at a position whereat it is accommodated behind the engagement surface 4a of the blocks 4 on the body 2 without projecting from the body.

To this aim, as shown in FIG. 5, the plate can be tilted upwards from the body 2 and held in that position by the frictional engagement taking place between the blocks 4 in the middle row and the middle slot 11.

Moreover, the provision of the bend 12 imparts the legs 7 with a degree of elasticity, thereby an elastic pressure is exerted on the plate glass workpiece without causing any damage.

For completeness of the description it should be added that, at the bottom end of the body 2, at the termination of the area affected by the blocks 4, there is provided a tab 30, also formed from rubber, which has the function in practice of a seal effective to reduce the amount of swarf that reaches the shoe, and is flexible and collapsible when the plate 6 is positioned at the first position.

When in use, and as mentioned above, the plate 6 may be positioned to face downwardly, thus allowing engagement with small size plate glass, such as a 40×40 mm workpiece, whereas, when larger size plate glass is handled, it will be possible, if found appropriate, to tilt the plate 6 upwards, thereby the latter is practically withdrawn fully between the blocks 4 and cannot interfere by contacting the plate glass being processed.

It will be appreciated from the foregoing that the invention achieves its objects, and in particular that a shoe has been provided which is of an extremely rational and functional design and affords an accessory item, represented by the plate 6, which allows processing of small size plate glass, while its removal is made possible without involving any special or complex operations.

It should be further noted that, if desired, the plate 6 may be left at its first position even while processing plate glass in quite large sizes, since it does not interfere with normal processing. Furthermore, the plate 6, instead of being journalled, may be telescopically connected, or connected through other means of equal usefulness.

In practicing the invention, the materials used, if compatible with the specific application, and the dimensions and contingent shapes, may be any selected ones to meet individual requirements.

Since the operation of a chamfering machine is known and is not part of this invention, the details of such operation are not described. For one skilled in the art it will be sufficient to note that in FIG. 1, the belt conveyor 100 moves with the same speed as the belt conveyor 3 and provides backing support in cooperation with further backing members, not shown, for the elongated tape like glass plate 101 of which only the upper edge is visible in FIG. 1 and which is clamped between the conveyor belts 100 and 3 and rests with its lower edge on a supporting surface indicated in 102 in FIG. 4 and is entrained by the conveyors 3 and 101 for the chamfering operation.

I claim:

1. A glass plate pressing or backingup shoe structure particularly for attachment on conveyor means of glass processing apparatus such as a glass plate edge bevelling machine comprising an elongate body having blocks on one face thereof, said blocks defining free engagement surfaces adapted for abutment engagement with a plate glass workpiece to be processed, and auxiliary supporting plate member, movably connected to said elongate body, said plate member being positionable in a first position, whereat said plate member forms a supporting extension of said elongate body and in a second idle position, whereat said plate member is accommodated within said elongate body behind said engagement surfaces.

2. A pressure shoe structure according to claim 1, wherein said plate member has a substantially yokelike configuration defining legs, said legs merging together at one end to form a blade portion, said blade portion having a soft layer coated thereon for elastic pressure abutment engagement with small plate glass workpieces.

3. A pressure shoe structure according to claim 2 wherein said legs of said plate member having a substantially yokelike configuration have a bend, said bend being formed at an intermediate portion of said legs to impart resiliency to said plate member.

4. A pressure shoe structure according to claim 1, wherein said plate member has pin formations journalled to said elongate body for moving said first position into said second position and vice versa, by a tilting movement.

5. A pressure shoe structure according to claim 1, wherein said blocks on said elongate body are arranged in longitudinally extending rows, said plate member has a substantially yokelike configuration defining legs, said legs defining a slot therebetween and extending longitudinally like said rows, said slot being adapted to frictionally engage at least one of said blocks to hold said plate member in at least one of said positions thereof.

6. A pressure shoe structure according to claim 1 further comprising an elastic tab, said elastic tab being provided on said elongate body and positioned transversely to said blocks, said elastic tab being elastically collapsible with said plate member in said first position.

* * * * *